US012766428B2

(12) United States Patent
Wolfinbarger

(10) Patent No.: US 12,766,428 B2
(45) Date of Patent: Oct. 20, 2026

(54) ACTION TOY WITH ROLLING ELEMENT FOR MANUAL ACTIVATION

(71) Applicant: Gigglicious, LLC, Avon, IN (US)

(72) Inventor: Ryan Wolfinbarger, Avon, IN (US)

(73) Assignee: Gigglicious, LLC, Avon, IN (US)

(*) Notice: Subject to any disclaimer, the term of this patent is extended or adjusted under 35 U.S.C. 154(b) by 247 days.

(21) Appl. No.: 18/731,504

(22) Filed: Jun. 3, 2024

(65) Prior Publication Data

US 2024/0399266 A1 Dec. 5, 2024

Related U.S. Application Data

(60) Provisional application No. 63/594,661, filed on Oct. 31, 2023, provisional application No. 63/470,318, filed on Jun. 1, 2023.

(51) Int. Cl.

*A63H 13/06* (2006.01)
*A63H 7/04* (2006.01)

(Continued)

(52) U.S. Cl.

CPC ............... *A63H 13/06* (2013.01); *A63H 7/04* (2013.01); *A63H 15/06* (2013.01); *F16C 3/02* (2013.01); *F16C 2316/30* (2013.01)

(58) Field of Classification Search

CPC ... A63H 3/20; A63H 7/04; A63H 7/06; A63H 13/06–08; A63H 15/06; F41J 5/18; F41J 5/24; F41J 5/26; F41J 5/205

See application file for complete search history.

(56) References Cited

U.S. PATENT DOCUMENTS 58,922 A * 10/1866 Weir ........................ A63H 7/04 446/286
672,707 A * 4/1901 Mackin et al. .......... A63H 7/04 446/274

(Continued)

FOREIGN PATENT DOCUMENTS

CN 103212207 A * 7/2013
CN 103212207 B 3/2015

(Continued)

OTHER PUBLICATIONS

Bakugan Battle Toy, Bakugan Starter Pack 3-Pack, Serpenteze, Amazon.com (no date) Bakugan Battle Brawlers, Kidz Kompany (no date).

(Continued)

*Primary Examiner* — Laura Davison
(74) *Attorney, Agent, or Firm* — Volpe Koenig

(57) ABSTRACT

A toy includes a counter-balanced frame including a counter balance coupled to a first end of the counter-balanced frame and a cover coupled to the counter-balanced frame. An axle is coupled to and extends through the counter-balanced frame, and the axle is configured to rotate relative to the counter-balanced frame. A rolling element is configured to rotate relative to the counter-balanced frame about an axis. The rolling element includes a pin extending from an outer surface of the rolling element generally parallel to and offset from the axle. An arm cam is mounted for pivoting movement relative to the counter-balanced frame and adapted to contact the pin of the rolling element, and an arm is connected to the arm cam, the arm being located outside of the cover. Upon rolling of the rolling element the pin causes the arm cam to actuate relative to the cover to produce arm movement.

24 Claims, 11 Drawing Sheets

(51) Int. Cl.

| | |
|---|---|
| ***A63H 15/06*** | (2006.01) |
| ***F16C 3/02*** | (2006.01) |

(56) References Cited

U.S. PATENT DOCUMENTS

| | | | | | |
|---|---|---|---|---|---|
| 1,277,702 | A * | 9/1918 | Des | F41J 5/26 446/4 |
| 2,088,510 | A | 7/1937 | Frasca | |
| 2,349,492 | A * | 5/1944 | Eakin | A63H 13/00 446/274 |
| 3,848,357 | A | 11/1974 | Morrison | |
| 3,864,870 | A | 2/1975 | Breslow et al. | |
| 3,927,883 | A | 12/1975 | Bosley et al. | |
| 9,345,978 | B1 | 5/2016 | Victor et al. | |
| 10,293,267 | B2 | 5/2019 | Rehkemper et al. | |
| 11,559,751 | B2 | 1/2023 | Trickett | |
| 2010/0048092 | A1 * | 2/2010 | Kenney | A63H 7/00 446/334 |

FOREIGN PATENT DOCUMENTS

| | | | | |
|---|---|---|---|---|
| EP | 0808645 | A1 * | 11/1997 | A63H 7/04 |
| RU | 2087173 | C1 * | 8/1997 | |
| RU | 2688279 | C1 * | 5/2019 | A63H 13/06 |
| WO | WO-2014174593 | A1 * | 10/2014 | A63H 13/06 |

OTHER PUBLICATIONS

Water Fanjose, https://amzn. to/3m0elAt (no date).
Zing-Ems, Mattel, 2012.
Pre-School Monkey, Fisher Price, 2010.
Yellow Chick, mfg. by Kids II, 2010.

* cited by examiner

ACTION TOY WITH ROLLING ELEMENT FOR MANUAL ACTIVATION

CROSS REFERENCE TO RELATED APPLICATIONS

This application claims the benefit of U.S. Provisional Application No. 63/594,661 filed on Oct. 31, 2023, and the benefit of U.S. Provisional Application No. 63/470,318 filed on Jun. 1, 2023, which are incorporated by reference as if fully set forth.

FIELD OF INVENTION

The present disclosure is directed to action toys, and more particularly it is directed to an action toy having arm movement upon rotation of a rolling element of the action toy.

BACKGROUND

Action toys are objects and assemblies that generally users play with for entertainment purposes. Many action toys and games are actuatable to produce movements that simulate fighting or punching. Some action toys can be designed to resemble a warrior or a character that is intended to fight or battle with other warriors or characters. As such, a user can choose a warrior or character and battle with other warriors or characters, with the goal of defeating your opponent in one way or another.

It would be desirable to provide an action toy that includes features to enhance play interest and that is simple to use and optionally does not require batteries.

SUMMARY

According to one aspect, the present disclosure is directed to a toy. The toy can include a counter-balanced frame including a counter balance coupled to a first end of the counter-balanced frame and a cover coupled to the counter-balanced frame, preferably from the second end, although it can be attached at any point(s) to the counter-balanced frame. A rolling element can be configured to rotate on or relative to the counter-balanced frame about an axis, such as an axis defined by an axle that can be coupled to and extend through the counter-balanced frame. The axle can be configured to rotate relative to the counter-balanced frame or be fixed, and the rolling element be coupled to or rotate on the axle. The rolling element can include a pin extending from an outer surface of the rolling element generally parallel to and offset from the axle. An arm cam is mounted for pivoting movement relative to the counter-balanced frame and adapted to contact the pin of the rolling element, and an arm can be located outside of the cover, the arm is connected to the arm cam. Upon rolling of the rolling element the pin causes the arm cam to actuate relative to the cover to produce movement of the arm.

In one aspect, the pin can extend from the outer surface of the rolling element in a direction away from the counter-balanced frame and parallel to an axis of the axle.

In one aspect, the cover remains in a generally upright position relative to the rolling element during rolling of the rolling element.

In one aspect, the rolling element includes a first ball segment and a second ball segment separate from the first ball segment, the first ball segment being coupled to a first axial end of the axle and the second ball segment being coupled to a second axial end of the axle.

In one aspect, the counter-balanced frame is centrally located between the first ball segment and the second ball segment, with the axle extending therethrough.

In one aspect, the counter-balanced frame remains free from contact with a rolling surface during rolling of the rolling element on the rolling surface.

In one aspect, the movement of the arm is a back and forth swinging arm movement.

In one aspect, the arm cam includes a shaft extending from the arm cam and through the cover in a direction generally parallel to an axis of the axle, the arm being coupled to the shaft of the arm cam.

In one aspect, a button is disposed at the second end of the counter-balanced frame and having a portion that extends inside cover, the button being actuatable between an extended orientation and a retracted orientation relative to the cover. Alternatively, the cover itself may be removably connected to the counter-balanced frame.

In one aspect, a triggering target located on the cover is biased outwardly from the cover, wherein upon compression of the triggering target, either a) a detent releases the button and the button is moved into the extended orientation or b) a detent releases the cover such that the cover at least one of moves relative to or pops off of the counter-balanced frame.

In one aspect, the button is spring biased via a spring that is oriented axially perpendicular to an axis of the axle. In the alternate embodiment, the cover is spring biased via a spring that is oriented axially perpendicular to an axis of the axle.

In one aspect, a resilient element biases the triggering target outwardly and biases the detent towards the triggering target, such that upon compression of the triggering target the resilient element is compressed.

In one aspect, the counter-balanced frame and/or the rolling element is adapted to be secured to and/or in a seat of a handle, and actuation of the handle causes the rolling element to roll within the seat to produce movement of the arm.

In one aspect, a trigger of the handle is actuated to cause at least one roller of the handle to rotate, the roller of the handle being in contact with the rolling element to cause the rolling element to roll within the seat to produce movement of the arm.

According to another aspect, the present disclosure is directed to a toy and actuator assembly. The toy and actuator assembly can include a toy and a handle actuator. The toy can include a counter-balanced frame. A rolling element can be coupled to and configured to rotate relative to the counter-balanced frame. An arm cam can be adapted to contact a pin of the rolling element, and an arm can be located outside of a cover, with the arm being connected to the arm cam. Upon rolling of the rolling element, the pin causes the arm cam to actuate to produce movement of the arm. The handle actuator is connectable to and separable from the toy. The handle actuator can include a grip with a seat disposed at one end of the grip. A trigger can be coupled to and actuatable relative to the grip. At least one roller can be coupled to the seat and actuatable by compression of the trigger, such that compression of the trigger causes the at least one roller to rotate relative to the seat. The at least one roller can be in contact with the rolling element upon the toy being connected to the handle actuator.

In one aspect, the rolling element is adapted to be secured within the seat of the handle, and actuation of the trigger causes the at least one roller to roll the rolling element within the seat to produce movement of the arm.

In one aspect, the trigger can be a grip pull trigger.

In one aspect, a biasing member is disposed between the grip and the trigger, and the biasing member is adapted to force the trigger in a direction away from the grip.

In one aspect, a bar is coupled to the seat and extends from the seat in a direction opposite the trigger, the bar being adapted to induce rotation of the seat relative to the grip.

In one aspect, a connector is disposed adjacent a front end of the grip, the connector being adapted for connecting to a connector of a second or separate action toy.

In one aspect, the connector is a plug and socket connector.

In one aspect, the connector can include a first connector being a rod and a second connector being a hook.

In one aspect, a clip can extend from the seat, the clip being adapted to connect the toy to the handle actuator.

In one aspect, the clip can be adapted to engage with at least one of the counter-balanced frame or a support connected to the counter-balanced frame of the toy to connect the toy to the handle actuator.

In one aspect, a braking mechanism can be actuated by the spring. The braking mechanism can include a brake pad configured to contact an inner surface of the rolling element to stop or slow rotation of the rolling element upon the triggering target being compressed.

BRIEF DESCRIPTION OF THE DRAWING(S)

The foregoing Summary as well as the following Detailed Description will be best understood when read in conjunction with the appended drawings, which illustrate a preferred embodiment of the disclosure. In the drawings.

Figure 8A:
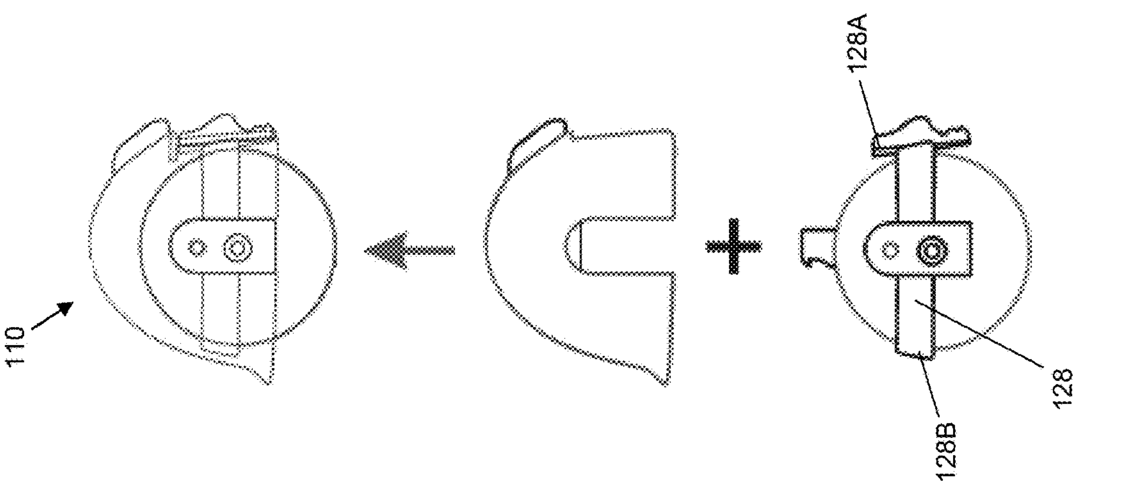

FIG. 8A includes side views of a second embodiment of the toy of the present disclosure in exploded and assembled orientations, with the cover shown transparent in the assembled orientation.

Figure 8B:
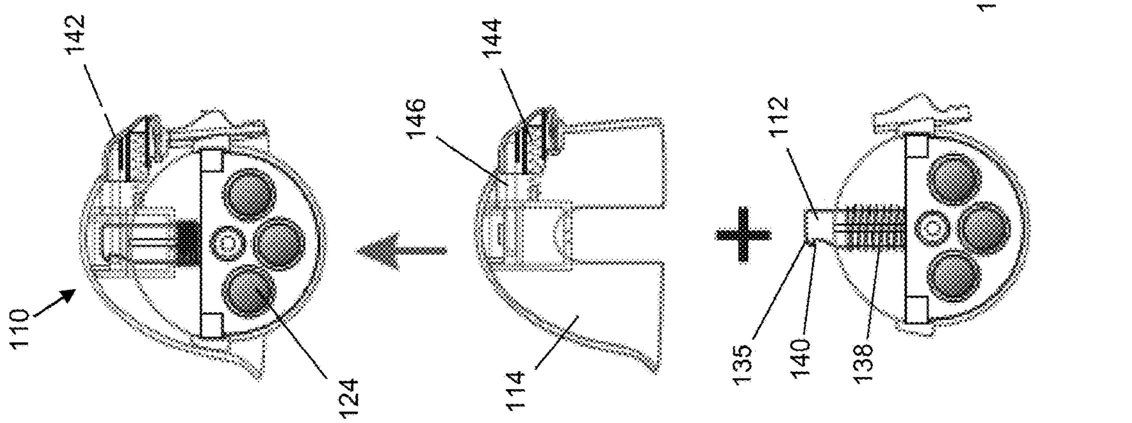

FIG. 8B includes side cross-sectional views of the toy of FIG. 8A in the exploded and assembled orientations.

Figure 8C:
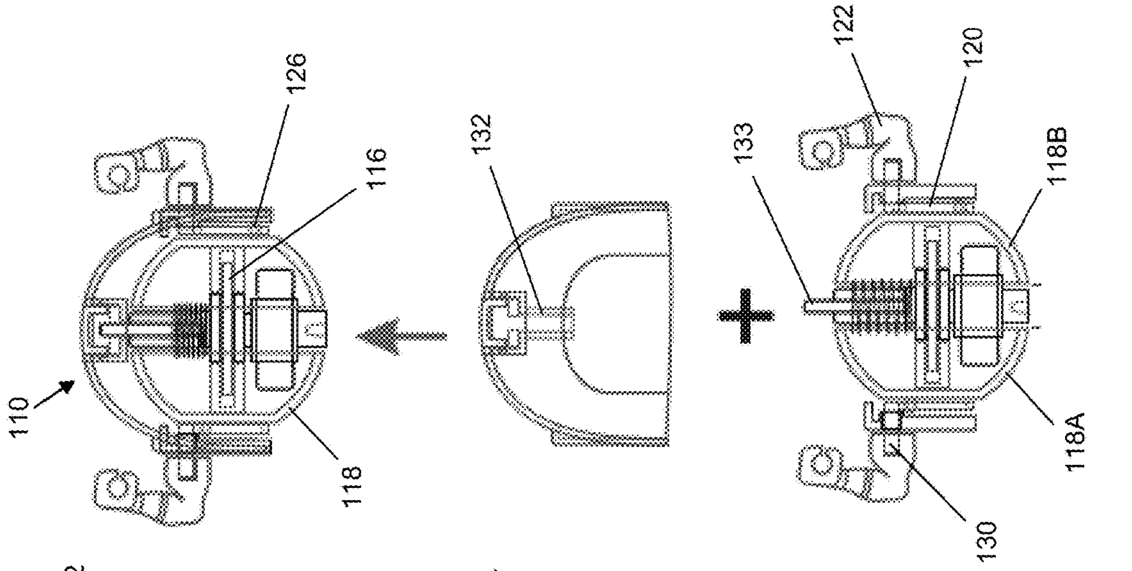

FIG. 8C includes front cross-sectional views of the toy of FIG. 8A in the exploded and assembled orientations.

Figure 8F:
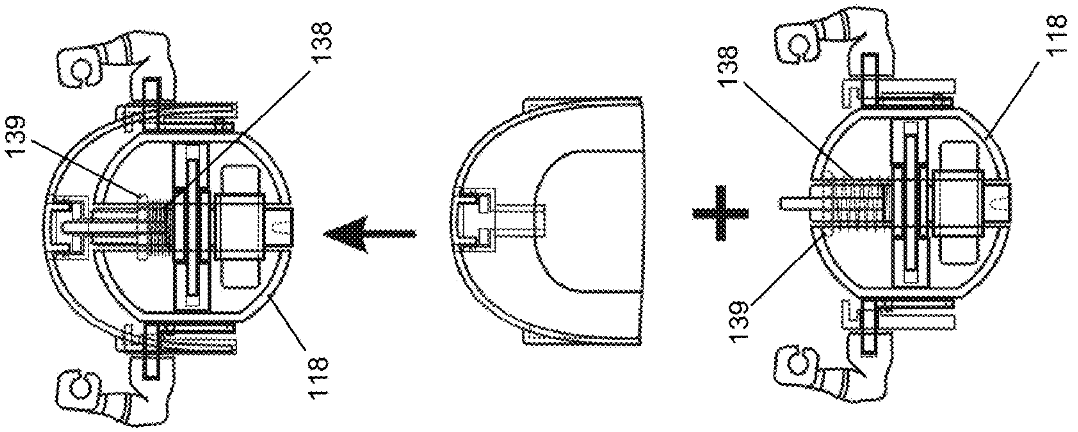
Figure 8E:
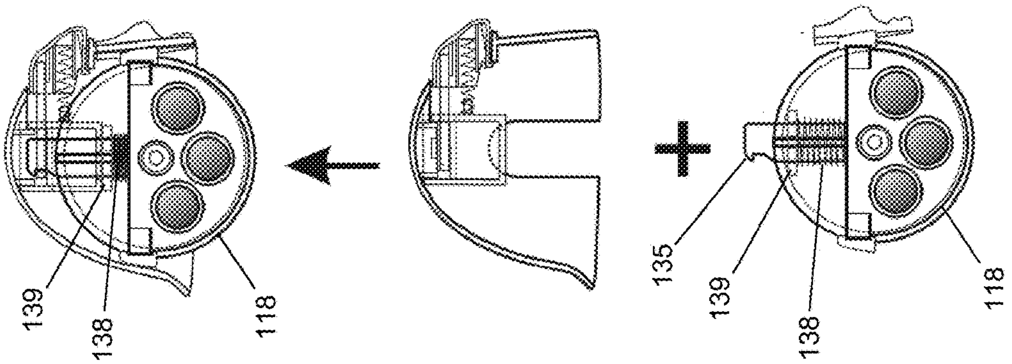
Figure 8D:
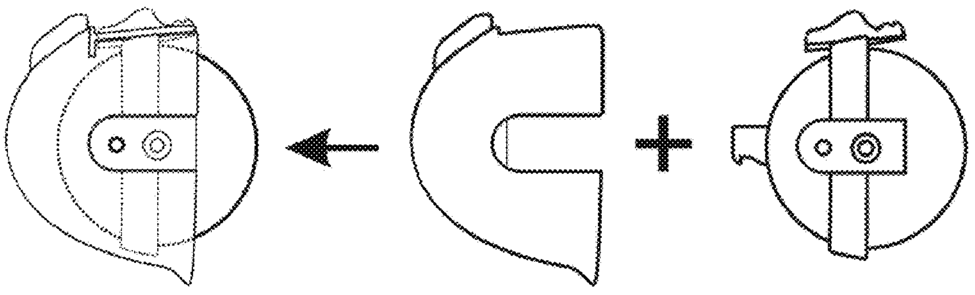

FIG. 8D includes side views of the second embodiment of the toy illustrated in FIG. 8A including a braking mechanism, with the cover shown transparent in the assembled orientation.

FIG. 8E includes side cross-sectional views similar to FIG. 8B of the toy illustrated in FIG. 8D in the exploded and assembled orientations, including the braking mechanism.

FIG. 8F includes front cross-sectional views similar to FIG. 8C of the toy illustrated in FIG. 8D in the exploded and assembled orientations, including the braking mechanism.

Figure 8H:
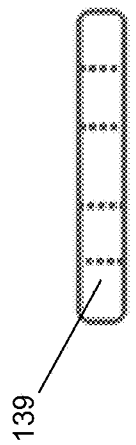
Figure 8G:
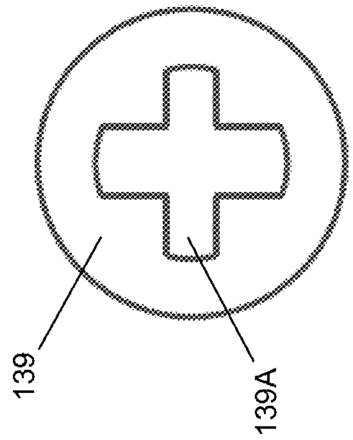

FIG. 8G is a top view of the braking mechanism of FIGS. 8D-8F.

FIG. 8H is a side view of the braking mechanism of FIGS. 8D-8F.

Figure 9B:
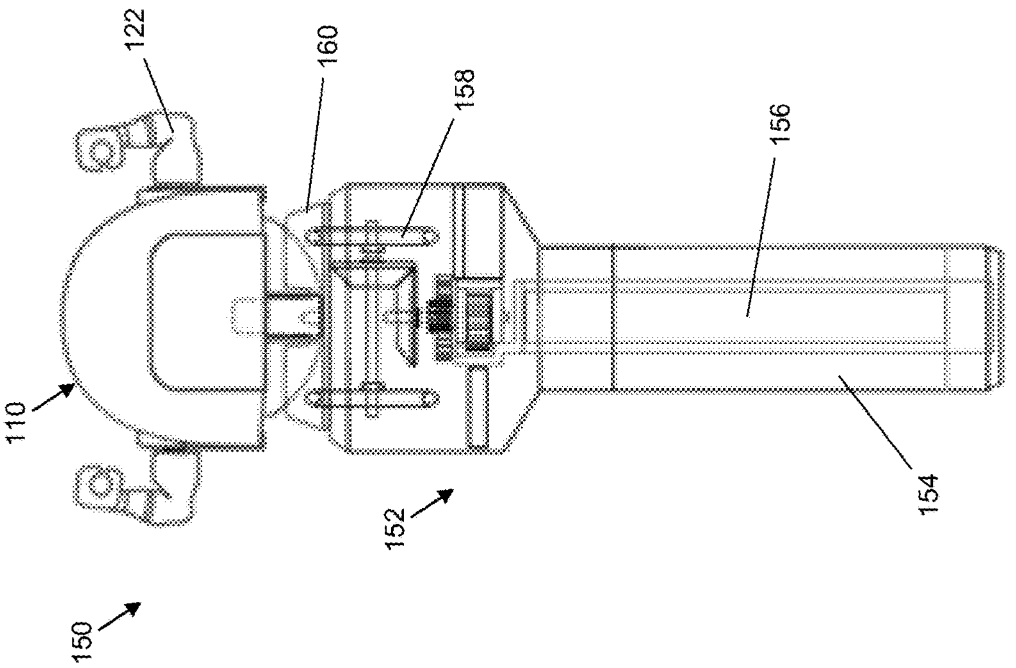
Figure 9A:
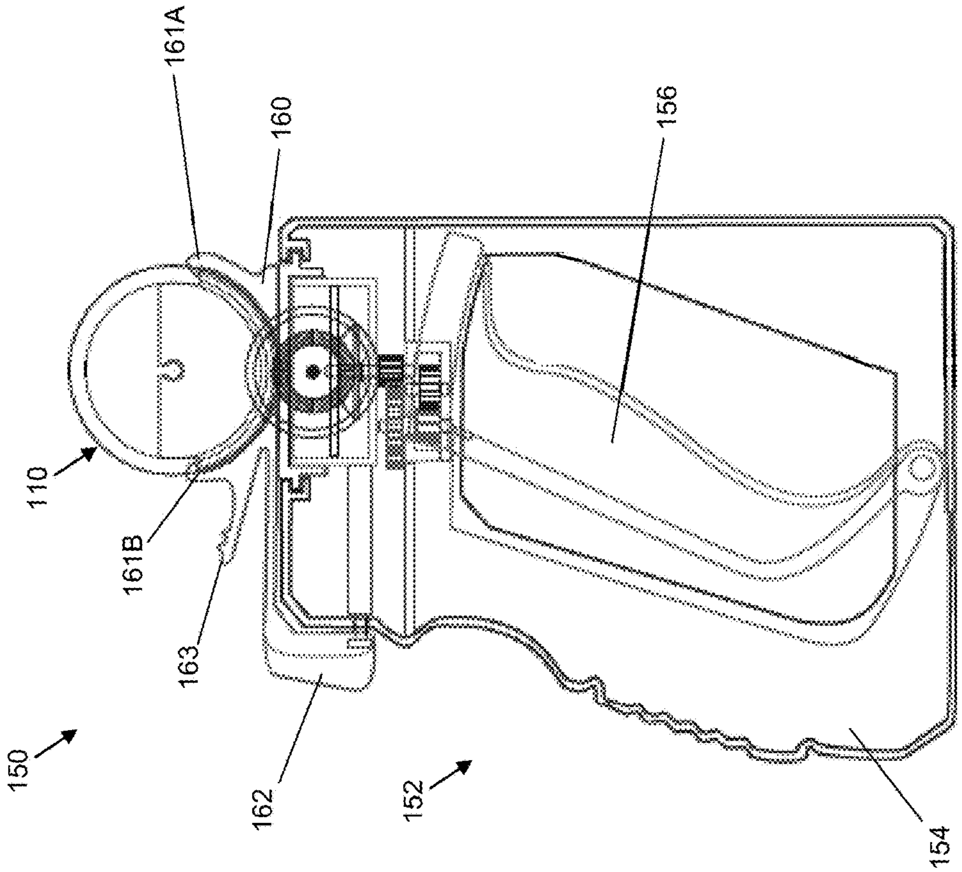

FIG. 9A is a side cross-sectional view of a second embodiment of a toy and actuator assembly with the toy of FIGS. 8A-8C connected to a second embodiment of a handle actuator.

FIG. 9B is a front cross-sectional view of the toy and actuator assembly of FIG. 9A.

Figures 10A, 10B, 10C:
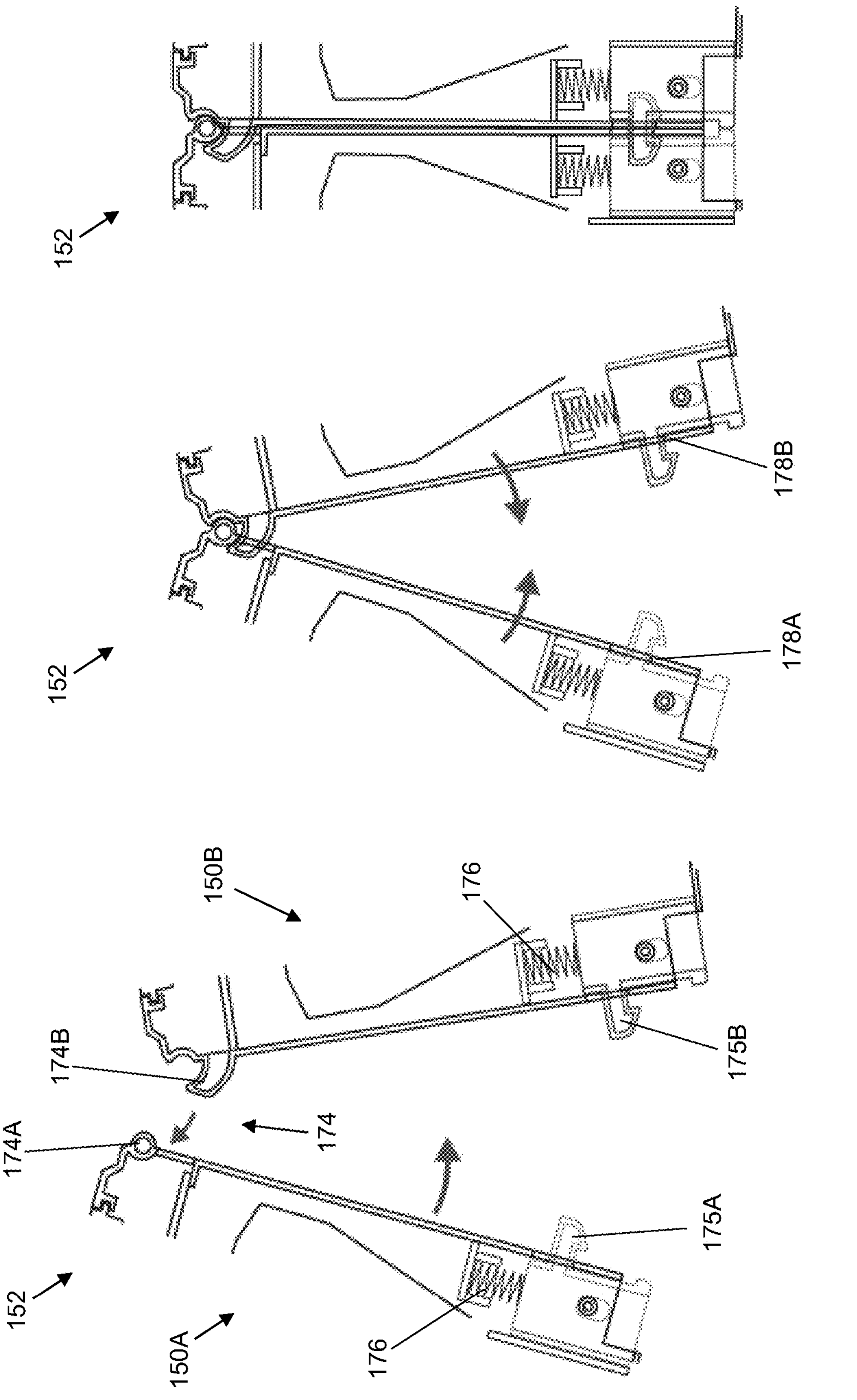

FIGS. 10A-10C are partial side views illustrating the process of connecting two of the toy and actuator assemblies of FIGS. 9A-9B.

Figure 11:
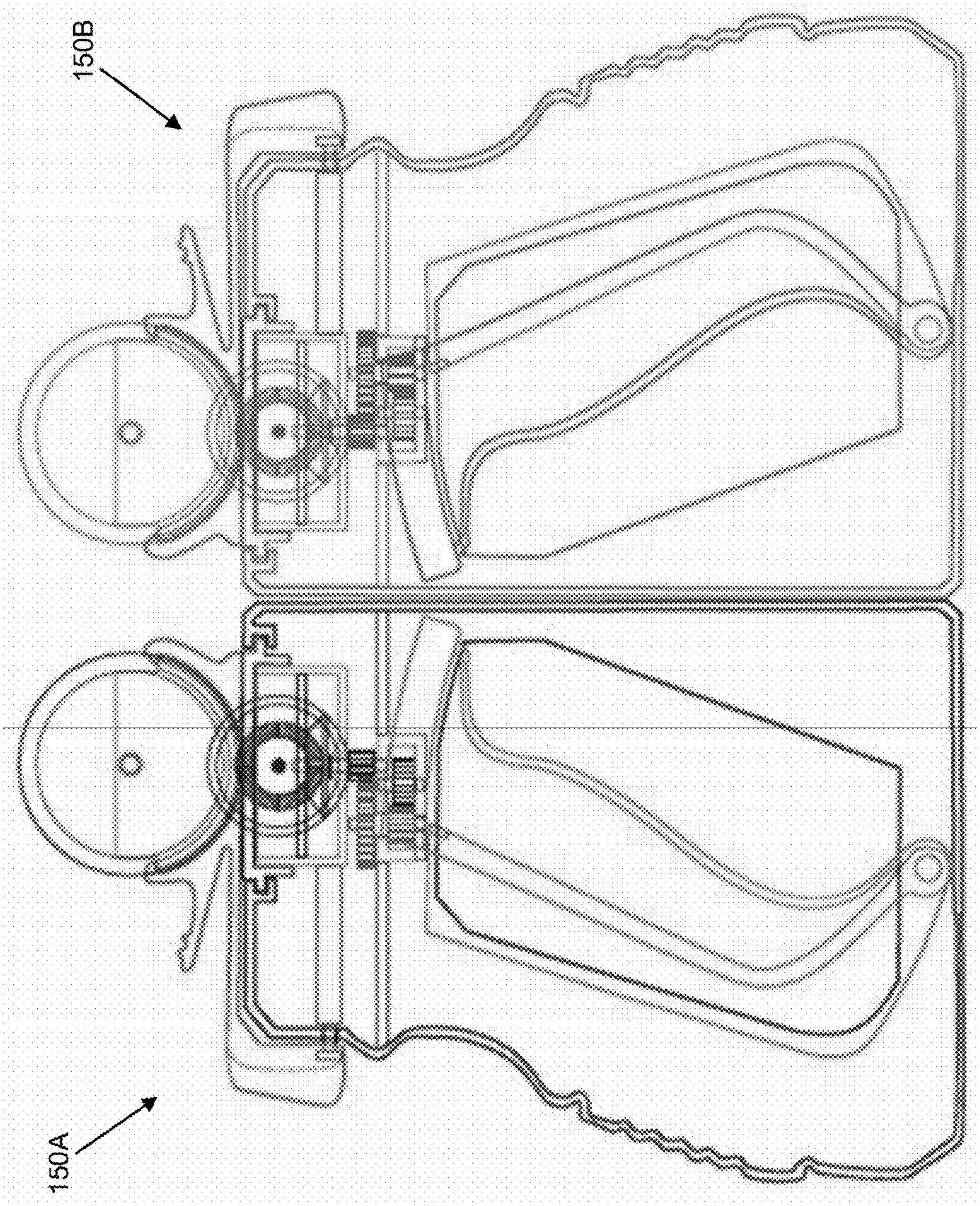

FIG. 11 is a side cross-sectional view illustrating two of the toy and actuator assemblies of FIGS. 9A-9B connected together.

DETAILED DESCRIPTION

Certain terminology is used in the following description for convenience only and is not limiting. The words “front”, “rear”, “upper”, and “lower” designate directions in the drawings to which reference is made. The words “inwardly” and “outwardly” refer to directions towards and away from parts referenced in the drawings. “Axially” refers to a direction along the axis of an axle, shaft, pin, or the like. A reference to a list of items that are cited as “at least one of a, b, or c” (where a, b, and c represent the items being listed) means any single one of the items a, b, or c, or combinations thereof are included. The terms “about” and “approximately” encompass +/−10% of an indicated value unless otherwise noted. The term “generally” in connection with a radial direction encompasses +/−25 degrees. The terminology includes the words specifically noted above, derivatives thereof and words of similar import. A “ball segment” as used herein refers to a cylindrical element, partial spherical segment (i.e., defined by cutting a sphere with a pair of parallel planes), or any other rollable element having an outer circumferential surface that is partially curved in an axial direction (i.e., in a plane that extends parallel to the rotation axis).

Figure 1:
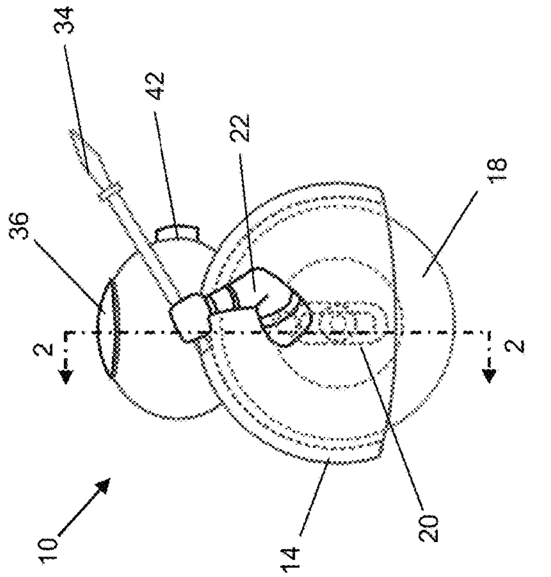
FIG. 1 is a side view of a toy of the present disclosure.
Figure 2:
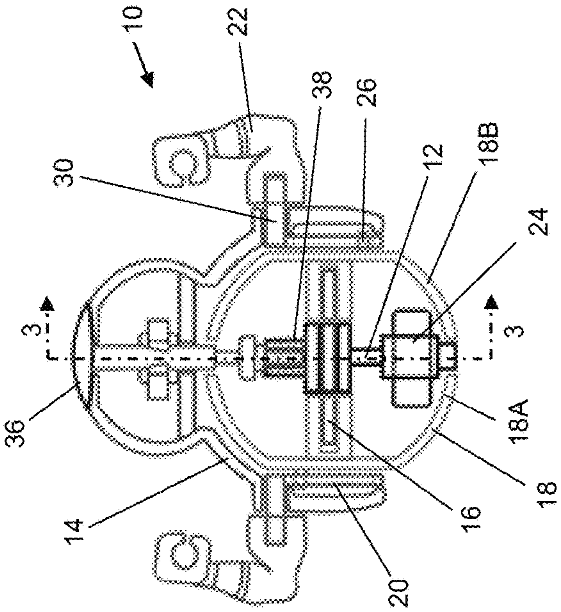
FIG. 2 is a cross-sectional view of the toy taken along Section 2-2 of FIG. 1.
Figure 3:
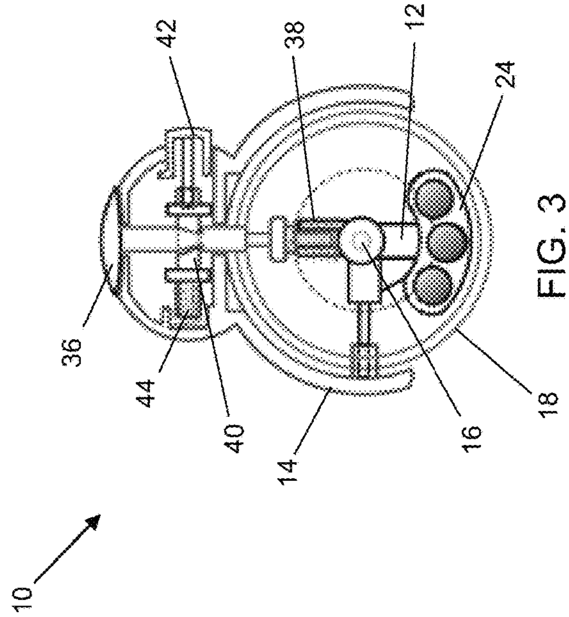
FIG. 3 is a cross-sectional view of the toy taken along Section 3-3 of FIG. 2.
Figure 4:
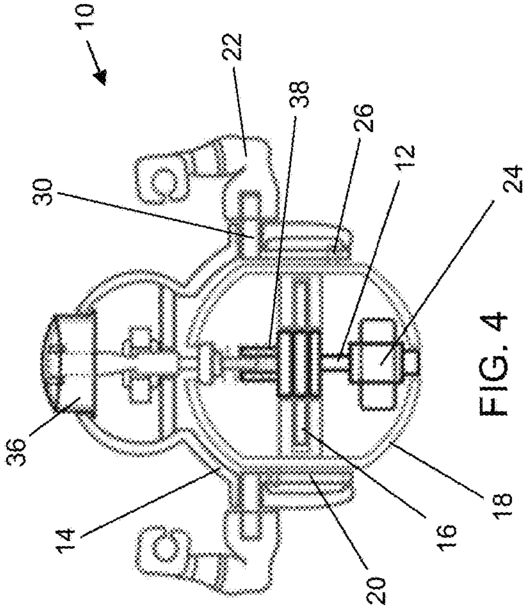
FIG. 4 is another cross-sectional view of the toy taken along Section 2-2 of FIG. 1 with a button in an extended orientation.

FIG. 1 is a side view of a toy 10 according to the present disclosure. FIG. 2 is a cross-sectional view of the toy 10 taken along Section 2-2 of FIG. 1. FIG. 3 is a cross-sectional view of the toy 10 taken along Section 3-3 of FIG. 2. FIG. 4 is another cross-sectional view of the toy 10 taken along Section 2-2 of FIG. 1 with a button in an extended orientation. FIGS. 1-4 will be discussed together.

The toy 10 of the present disclosure is an assembly that generally a user may play with for entertainment. The toy 10 includes actuatable arms 22 that move back and forth to produce arm movements that simulate fighting or punching. Further, the toy 10 of the present disclosure can be designed to resemble a warrior or other character that is intended to fight or battle with other warriors or characters. As such, a user can choose a toy 10 resembling a warrior or character of their liking, and then battle with other warriors or characters with the goal of defeating their opponent in one way or another. It is to be understood that in other embodiments, the toy 10 could be any other desired character, such as for example, a bird, an elephant, an airplane, or any other animal, character, or figurine. As such, in other embodiments, the actuatable arms 22 may not be physical arms that resemble human arms. Rather, it is to be understood that the term "arm" of the present disclosure is used in the broadest sense and includes any rotating or pivoting appendage that extends from a body, which could include an anatomical arm, leg, wing, trunk, or any other actuatable element that pivots or rotates relative to the body of the toy.

As shown in FIGS. 1-4, the toy 10 includes at least a counter-balanced frame 12, a cover 14, and a rolling element 18 preferably in the form of a ball segment, an arm cam 20, and an arm 22. The counter-balanced frame 12 can be positioned generally at a center of the toy 10 in the width-wise and lengthwise directions, when the toy 10 is in an upright ("standing") position. The counter-balanced frame 12 can include a counter balance 24 coupled to a first end of the counter-balanced frame 12, with the first end being adjacent the ground or supporting surface. The counter-balanced frame 12 can also include the cover 14 coupled thereto, preferably at a second end of the counter-balanced frame 12, with the second end being an opposite end of the counter-balanced frame 12 as the first end. However, the specific location of the connection between the cover 14 and the counter-balanced frame 12 can vary. In the illustrated embodiment, the second end of the counter-balanced frame 12 is the end of the counter-balanced frame 12 positioned furthest from the ground or supporting surface when the toy 10 is in the upright position.

The counter balance 24 can be coupled to the counter-balanced frame 12 through various approaches, such as a fastener, adhesive, clip, integrated or integral molding, etc. In some examples, the counter balance 24 can be constructed from a metallic material. In other examples, the counter balance 24 can be constructed from a non-metallic material, such as a polymeric material. In any example, the counter balance 24 is a weight that is coupled to the first end of the counter-balanced frame 12 to facilitate and ensure the toy 10 remains in a generally upright position during use, with the counter balance 24 positioned adjacent to but not contacting the ground, rolling, or other supporting surface. In some examples, as shown in FIG. 2, the counter balance 24 can be symmetric about a central plane extending vertically through the counter-balanced frame 12, ensuring the toy 10 is equally balanced in a widthwise direction (the left and right direction as illustrated in FIG. 2).

The cover 14 is coupled to the counter-balanced frame 12 and is located generally opposite to the counter balance 24 to ensure the cover 14 remains in a generally upright position during use of the toy 10, discussed further below. Further, as illustrated in FIG. 3, the cover 14 can also be coupled to the counter-balanced frame 12 not only at the second end of the counter-balanced frame 12, but also at an inner, rear surface of the cover 14 through a stabilizer bar or the like to further stabilize the cover 14 relative to the counter-balanced frame 12 and the counter balance 24. The cover 14 can have a generally rounded or dome shape with a head shaped protrusion extending therefrom upwards away from the generally rounded or dome shaped body and adjacent the second end of the counter-balanced frame 12. As such, the cover 14 can resemble a human or character without legs, such that the rolling element 18 replaces the legs. Further, the cover 14 can have an ornamental design and the cover 14 can resemble a warrior or other type of fighting character. In some examples, the cover 14 can be constructed from a polymeric material.

The rolling element 18 is mounted for rotation on and/or relative to the counter-balanced frame 12. In the illustrated embodiment, the rolling element 18 is mounted rotatably on or non-rotatably to an axle 16. The axle 16 can be coupled to and extend through the counter-balanced frame 12 at a position between the first and second ends of the counter-balanced frame 12. Further, in some examples, the axle 16 can be positioned closer to the first end of the counter-balanced frame 12 than the second end of the counter-balanced frame 12. The axle 16 can be a pin, rod, dowel, or the like that is configured to rotate relative to the counter-balanced frame 12. In some examples, the axle 16 can be constructed from a metallic material. As shown best in FIG. 2, the axle 16 can extend through the counter-balanced frame 12, which may be provided with a bearing for receiving the axle 16, and remain fully within an interior of the cover 14. The axle 16 could also be fixed to the counter-balanced frame 12.

The rolling element 18 can be non-rotatably coupled to the axle 16, and the rolling element 18 can be configured to rotate along with the axle 16. Alternatively, the rolling element 18 can rotate on the axle 16. Further, the rolling element 18 can be positioned at least partially within the cover 14, such that the rolling element 18 is free from direct contact with the cover 14. As such, during rotation of the rolling element 18, it rotates within the cover 14 but does not come into direct contact with the cover 14. The rolling element 18 can extend a greater radial distance from the axle 16, with respect to a central rotation axis of the axle 16, than the distal end of the first end of the counter-balanced frame 12 having the counter balance 24. Therefore, the counter-balanced frame 12 remains free from contact with a support or rolling surface during rolling/rotation of the rolling element 18 on the support or rolling surface. Further, due to the counter balance 24, the cover 14 remains in a generally upright position relative to the rolling element 18 during rolling of the rolling element 18.

In some examples, the rolling element 18 can include a first ball segment 18A and a second ball segment 18B, with the second ball segment 18B being separate from the first ball segment 18A. The first ball segment 18A can be coupled to a first axial end of the axle 16 and the second ball segment 18B can be coupled to a second axial end of the axle 16. The second axial end of the axle 16 being positioned at an opposite end of the axle 16 as the first axial end. Alternatively, the first and second ball segments 18A, 18B can be rotatably mounted on the axle 16, or otherwise rotatably supported on the counter-balanced frame 12. The counter-balanced frame 12 can be centrally located between the first ball segment 18A and the second ball segment 18B, and the axle 16 can extend therethrough. Therefore, the first and second ball segments 18A, 18B can be symmetrically oriented relative to a central plane extending through the counter-balanced frame 12 in the vertical direction (as illustrated in FIG. 2). The first and second ball segments 18A, 18B of the rolling element 18 are configured to rotate together along with the axle 16 to produce movement of the arm 22, as discussed further below. Alternatively, first and second ball segments 18A, 18B of the rolling element 18 may be configured to rotate independently of each other on the axle 16.

The rolling element 18 can include a pin 26 coupled to and extending from an outer surface of the rolling element 18 in a direction generally parallel to and offset from the axle 16. More specifically, each of the first and second ball segments 18A, 18B preferably includes a pin 26 coupled to and extending from a respective outer surface of the first and second ball segments 18A, 18B in a direction generally parallel to and offset from the axle 16. Additionally, each of the pins 26 can extend from the outer surface of the rolling element 18 (or the first and second ball segments 18A, 18B) in a direction away from the counter-balanced frame 12 and parallel to an axis of the axle 16. Each of the pins 26 are formed integral with or coupled to the rolling element 18, and each of the pins 26 are configured to rotate with the rolling element 18 about the axis of the axle 16 during rotation or rolling of the rolling element 18.

The toy 10 can include arm cams 20 positioned on each side of the toy 10 between an outer surface of the rolling element 18 and the cover 14. More specifically, an arm cam 20 can be positioned between an outer surface of the first ball segment 18A and the cover 14, and another arm cam 20 can be positioned between an outer surface of the second ball segment 18B and the cover 14 on the opposite side of the toy 10. The arm cams 20 can have a generally rectangular-oval or racetrack shape, with the arm cams 20 being longer than they are wide, or vice-versa. Further, each of the arm cams 20 is adapted to move within the cover 14, and each arm cam 20 can be adapted to contact a pin 26 on one side of the rolling element 18. Each of the arm cams 20 can include a shaft 30 extending from the respective arm cam 20 in a direction away from the counter-balanced frame 12, parallel with the axis of the axle 16, and offset from the axis of the axle 16. Further, each of the shafts 30 can extend through the cover 14 and be coupled to an arm 22 positioned on each respective side of the cover 14 and the overall toy 10.

In some examples, the toy 10 can include an arm 22 located outside of the cover 14 on each side of the cover 14. As such, in some examples, the toy 10 can include two arms 22. In other examples, the toy 10 can include more than or less than two arms 22. Each of the arms 22 of the toy 10 can be coupled to axial ends of the shafts 30 of the arm cams 20 extending through the cover 14. Further, in some embodiments, the shafts 30 of the arm cams 20 may be rotationally supported by the cover 14, such that the shafts 30 and the arm cams 20 can rotate relative to the cover 14. Additionally, with each of the arms 22 non-rotatably coupled to the shafts 30, each of the arms 22 can rotate with shafts 30 and the arm cams 20 relative to the cover 14.

In operation, the rolling element 18 can be rolled upon a rolling surface, and during the rolling, the cover 14 will remain in a generally upright position due to the counter balance 24 coupled to the first end of the counter-balanced frame 12. More specifically, due to the counter balance 24 having a greater mass than the cover 14, gravity will force the counter balance 24 to remain adjacent the rolling surface while the cover 14 remains in a generally upright position. Further, during the rolling of the rolling element 18, the pins 26 rotate around the axis of the axle 16 such that the pins 26 travel a path that encircles the axis of the axle 16 during rotation. The pins 26 are coupled to or in contact with the arm cams 20, and during rotation of the rolling element 18, the pins 26 cause the arm cams 20 to actuate and rotate about their respective shafts 30 which are rotationally coupled to the cover 14. In turn, actuation of the arm cams 20 relative to the cover 14 produces movement of the arms 22 in a back and forth swinging arm 22 movement.

Therefore, rolling of the rolling element 18 on a rolling surface causes actuation and movement of the arms 22, which can be a back and forth swinging arm 22 movement that simulates fighting or punching by the toy 10. In some examples, a bevel gear (or other gearing) can be included that can change the swinging arm 22 movement from a back and forth (backwards and forwards) swinging arm 22 movement to a side to side swinging arm 22 movement (relative to the rolling direction of the toy 10), to achieve the desired movement of the arms 22 of the toy 10. In addition, as illustrated in FIG. 1, each of the arms 22 can include a receptacle for receiving a toy weapon 34 or other item that is held within a hand of the arm 22. In some examples, the toy weapon 34 could be a toy sword, knife, axe, spear, or other similar device historically used in battle. The rolling of the rolling element 18 and the movement of the arms 22 can be used to simulate fighting or swinging of the toy weapon 34 that is held within a hand of each of the arms 22 of the toy 10. In other examples, the toy weapon 34 may not be included or held by the arms 22 of the toy 10.

Referring to FIGS. 2-4, the toy 10 can also include a button 36 coupled to the counter-balanced frame 12. In the illustrated embodiment, the button 36 is located at the second end of the counter balanced frame 12. The button 36 can include a portion that extends inside the cover 14 and another portion that extends outside the cover 14. The button 36 can be actuatable between an extended orientation (FIG. 4) and a retracted orientation (FIGS. 2-3) relative to the cover 14. The button 36 can be spring biased via a spring 38 that is positioned within the cover 14 and can also be located within the rolling element 18, as illustrated. Further, the spring 38 can be positioned adjacent and between the axle 16 and a base of the button 36, with the spring 38 being perpendicular to an axis of the axle 16. Upon release of the button 36, the spring 38 is configured to force the button 36 upwards from the retracted orientation to the extended orientation. A detent 40 can be provided within the cover 14 that is configured to engage with the button 36 to hold the button 36 in the retracted orientation. Upon release of the detent 40, the button 36 is forced upwards away from the axle 16 to the extended orientation.

The toy 10 can further include a triggering target 42 positioned on a front surface of the cover 14, with respect to the rolling direction of the toy 10. The triggering target 42 can be a location or target in which a fighting opponent aims for and attempts to strike during battle between two or more of the toys 10. If and when the triggering target 42 is struck, the button 36 is actuated into the extended orientation to indicate that the toy 10 has been "defeated". The triggering target 42 can include a portion extending outwards from the cover 14, the portion preferably being perpendicular to an axis of the button 36. Further, the triggering target 42 can include a second portion extending within the cover 14 that is coupled to the detent 40, such that the triggering target 42 and the detent 40 are actuatable and translate together in the same direction.

The triggering target 42 and the detent 40 are both biased by a resilient element 44 which is positioned between the cover 14 and the detent 40. The triggering target 42 is biased outwardly away from the cover 14 and the counter-balanced frame 12, and the detent 40 is biased towards the triggering target 42. The biasing force produced by the resilient element 44 ensures that the detent 40 remains engaged with the button 36 to hold the button 36 in the retracted orientation until the triggering target 42 is struck and compressed, and then the button 36 is released into the extended orientation.

More specifically, upon compression of the triggering target 42, the resilient element 44 is compressed and the detent 40 and the triggering target 42 translate generally horizontally together in a direction perpendicular to an axis of the button 36. This generally horizontal translation causes the detent 40 to release from the button 36, which allows the button 36 to move and translate into the extended orientation. To reset the button 36 after the button 36 has been released and extended, a user pushes the button 36 downward towards the axle 16 until the detent 40 engages with a groove or other feature of the button 36. After that, the button 36 will remain in the retracted orientation until the button 36 is again released by compression of the triggering target 42.

Figure 3A:
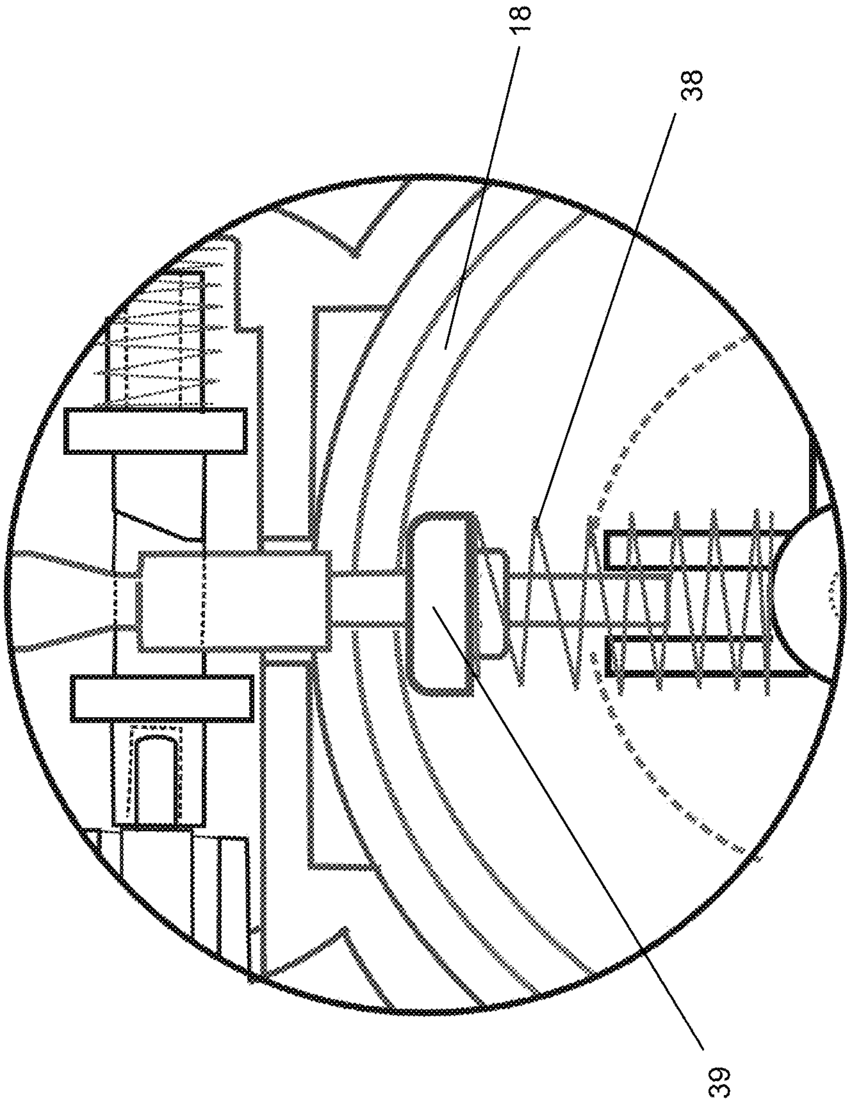
FIG. 3A is a magnified detail view of a portion of the toy illustrated in FIG. 3.

Referring to FIG. 3A, which is a magnified view of a portion of the toy 10 in FIG. 3, the details of a braking mechanism are illustrated. The braking mechanism includes a brake pad 39 positioned between the button 36 and the spring 38, and the brake pad 39 can be positioned adjacent and contacting an axial distal end of the spring 38 positioned furthest from the axle 16. The brake pad 39 can be configured to be coupled to the spring 38, such that the brake pad 39 translates along with the spring 38 when the button 36 has been released and extended. In some examples, the brake pad 39 can have a flat or shallow cylindrical shape.

As illustrated in FIG. 3, when the button 36 is in the locked or downward position, the braking mechanism is positioned within the rolling element 18 such that the brake pad 39 is not in contact with any surface of the rolling element 18. After the triggering target 42 has been compressed, the spring 38 forces the button 36 and the brake pad 39 upwards into the released and extended position. Referring again to FIG. 3A, once the braking mechanism is actuated and the brake pad 39 has been forced and translates upwards away from the axle 16, the brake pad 39 comes into contact with an inner surface of the rolling element 18. Specifically, the brake pad 39 is forced into contact with an inner surface of each of the first ball segment 18A and the second ball segment 18B of the rolling element 18. The contact and engagement between the brake pad 39 and the rolling element 18 creates friction which is intended to stop or reduce the rolling velocity of the rolling element 18.

As such, the braking mechanism including the brake pad 39 is configured to slow down or stop the rolling function of the rolling element 18 once the triggering target 42 has been compressed and the button 36 has been released into the extended position. Stopping or reducing the rolling speed of the toy 10 allows the user to easily grab the toy 10 and reset the button 36 by pushing the button 36 downward towards the axle 16 until the detent 40 engages with a groove or other feature of the button 36. After that, the button 36 will remain in the retracted orientation until the button 36 is again released by compression of the triggering target 42.

Figure 5B:
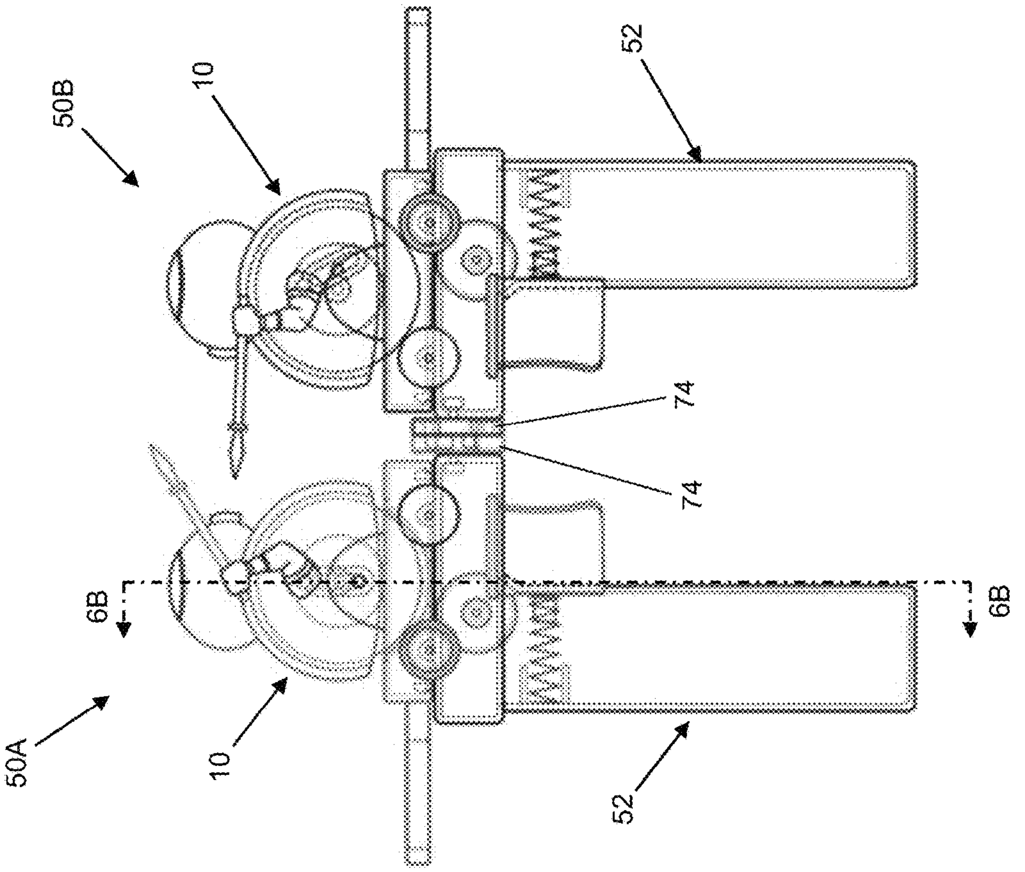
FIG. 5B is a side view of two toy and actuator assemblies of the present disclosure connected together.
Figure 5A:
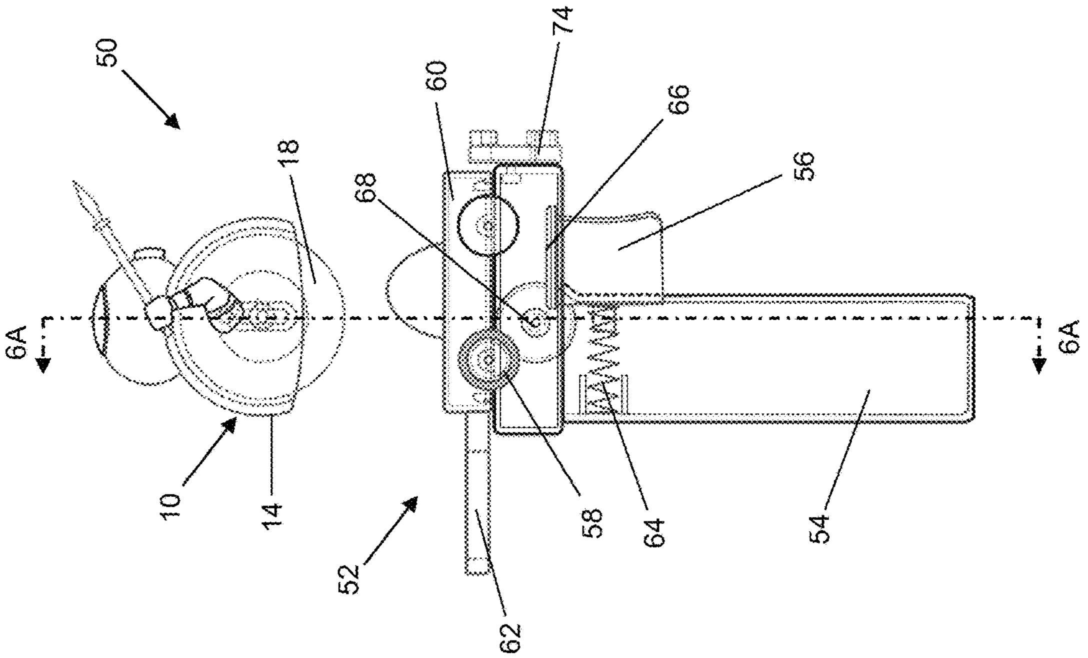
FIG. 5A is a side view of a toy and actuator assembly of the present disclosure shown with the toy of FIGS. 1-4 separated from a handle actuator.
Figure 6B:
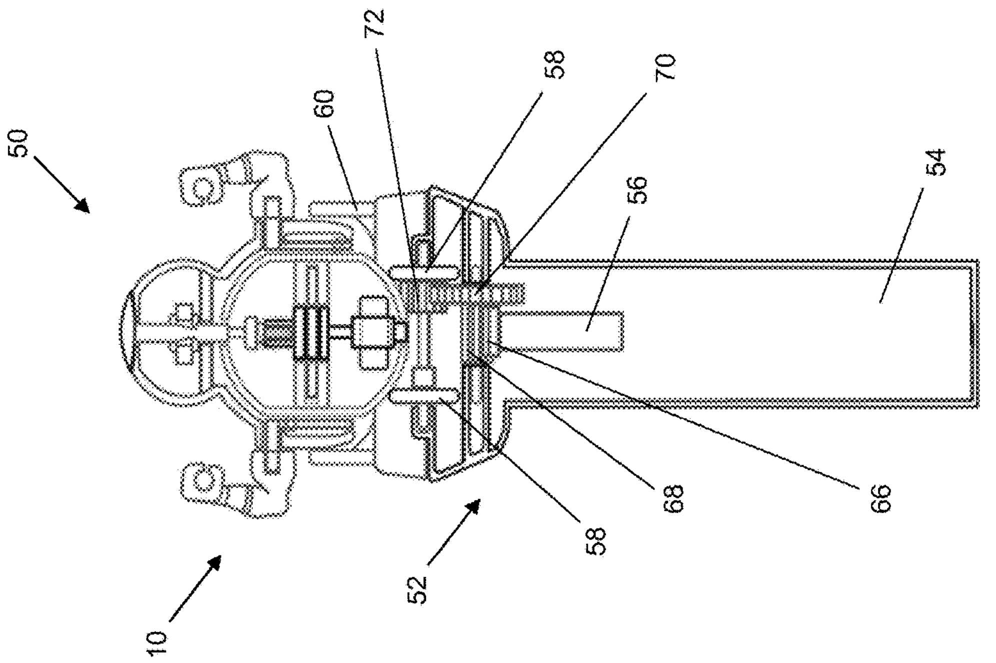
FIG. 6B is a cross-sectional view of the toy and actuator assembly taken along Section 6B-6B of FIG. 5B.
Figure 6A:
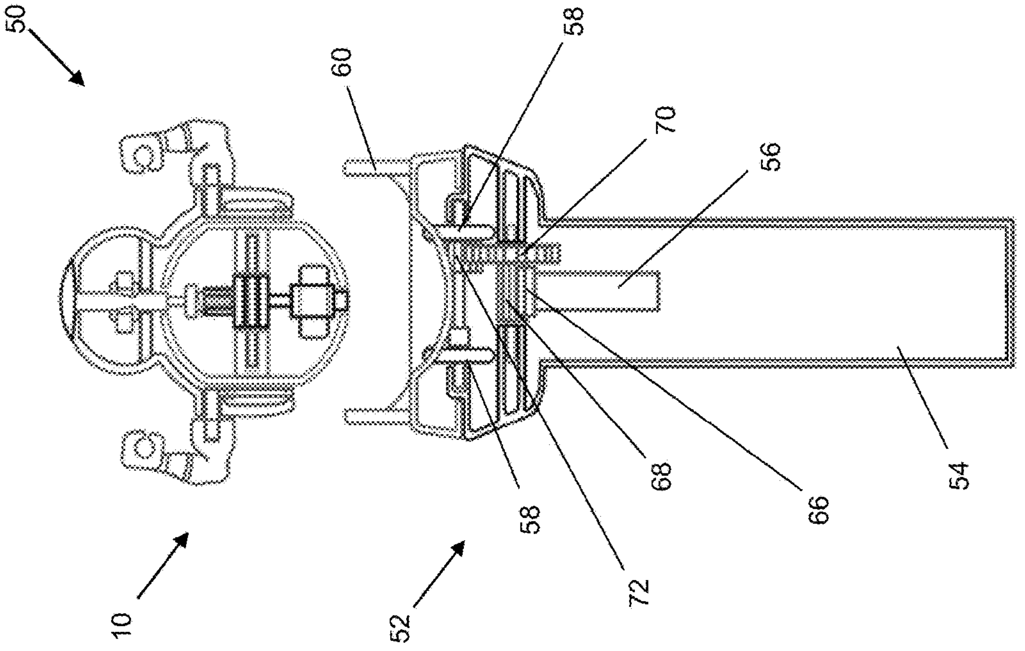
FIG. 6A is a cross-sectional view of the toy and actuator assembly taken along Section 6A-6A of FIG. 5A.
Figure 7B:
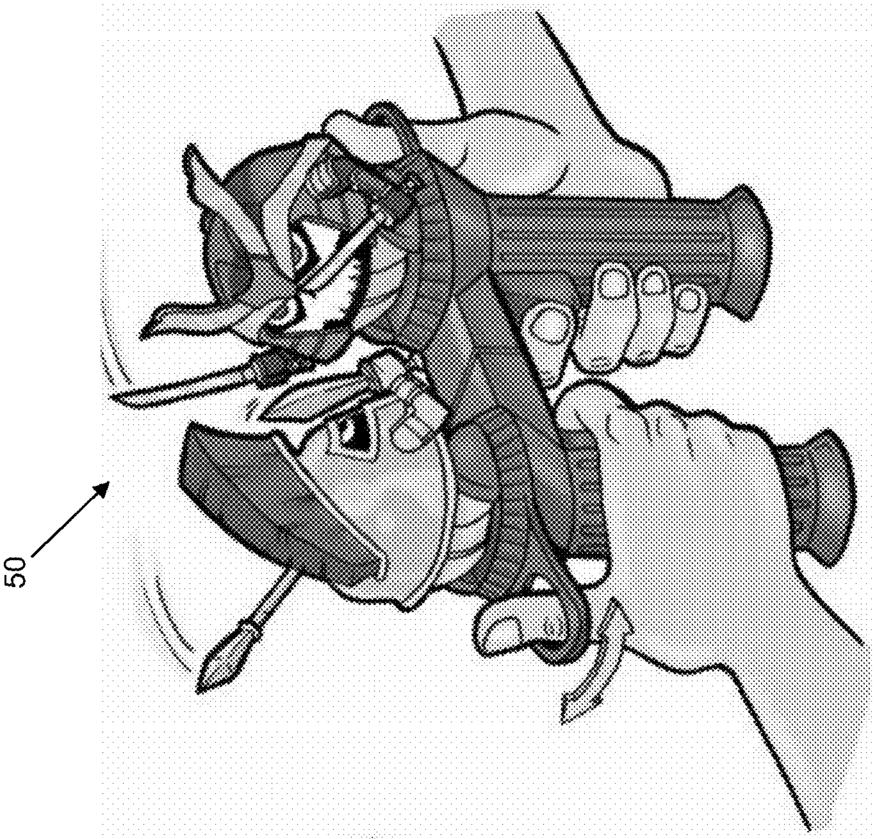
FIGS. 7A and 7B are perspective views of two toy and actuator assemblies of the present disclosure shown connected together and disconnected.
Figure 7A:
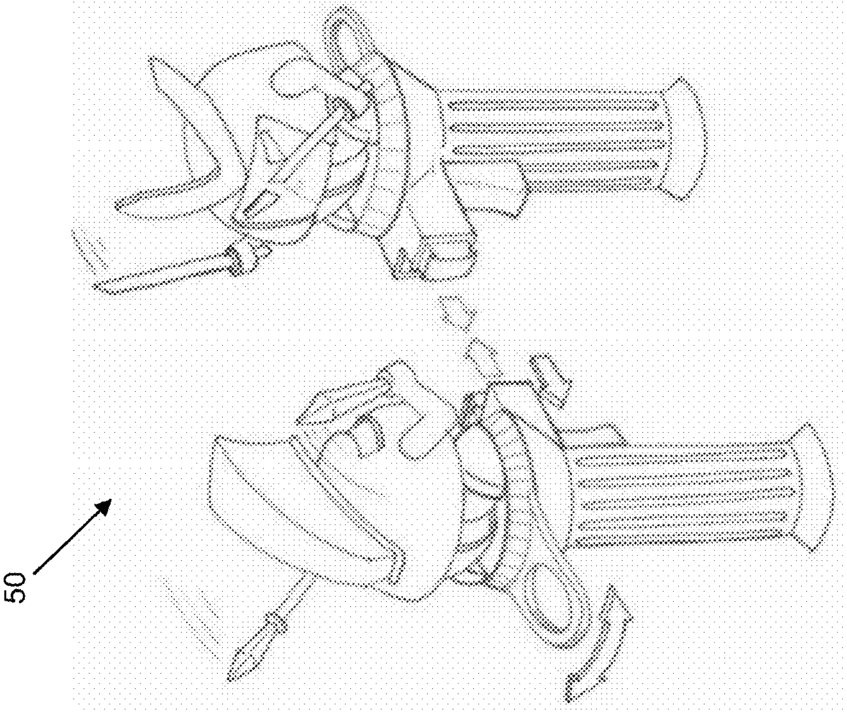

FIG. 5A is a side view of a toy and actuator assembly 50 of the present disclosure. FIG. 5B is a side view of two toy and actuator assemblies 50A, 50B of the present disclosure connected together. FIG. 6A is a cross-sectional view of the toy and actuator assembly 50 taken along Section 6A-6A of FIG. 5A. FIG. 6B is a cross-sectional view of the toy and actuator assembly 50 taken along Section 6B-6B of FIG. 5B. FIGS. 7A-7B are perspective views of the two toy and actuator assemblies 50A, 50B of the present disclosure connected and disconnected. FIGS. 5A-7B will be discussed together.

The toy 10 discussed with reference to FIGS. 1-4 can be utilized along with a handle actuator 52 to form the toy and actuator assembly 50. The counter-balanced frame 12 and/or the cover 14 or the rolling element 18 of the toy 10 can be adapted to be secured to and/or in a seat 60 of the handle actuator 52, and actuation of the handle actuator 52 can cause the rolling element 18 to rotate or roll within the seat 60 to produce movement of the arms 22, as previously discussed. More specifically, the handle actuator 52 can include a trigger 56 that can be actuated to cause at least one roller 58 of the handle actuator 52 to rotate. The at least one roller 58 can be in contact with the rolling element 18 to cause the rolling element 18 to rotate or roll within the seat 60 to produce the movement of the arm(s) 22. The toy and actuator assembly 50 including the toy 10 and the handle actuator 52 will be discussed in detail below.

The handle actuator 52 is connectable to and separable from the toy 10, such that the toy 10 can roll along a rolling surface to produce movement of the arms 22, and the toy 10 can be connected to the handle actuator 52 to produce movement of the arms 22. The handle actuator 52 can include at least a grip 54, a trigger 56, and at least one roller 58. The grip 54 can be the portion of the handle actuator 52 that a user holds during use of the toy and actuator assembly 50. The grip 54 can include a seat 60 disposed at an upper axial end of the grip 54, with respect to the orientation illustrated in FIG. 5A which is the orientation the toy and actuator assembly 50 and handle actuator 52 would be oriented during use of the toy and actuator assembly 50.

As illustrated in FIG. 6A, the seat 60 can have a generally U-shape or a part-spherical shaped recess to accept and secure the toy 10 within the seat 60. As such, the seat 60 includes a generally complementary mating shape as the lower end or portion of the toy 10 (i.e., the rolling element 18 and the cover 14). The seat 60 is coupled to the grip 54 in a way that allows the seat 60 to rotate relative to the grip 54, for example using a simple bearing formed by a groove or recess in which the seat 60 can slidably rotate. More specifically, the seat 60 can include a bar 62 coupled to and extending from the seat 60 in a direction away from and opposite the trigger 56. A user can engage with the bar 62 to rotate the bar 62 and the seat 60 relative to the grip 54 to change the angle of positioning of the toy 10 relative to the grip 54. More specifically, as illustrated in FIGS. 7A-7B, a user can insert their thumb into an aperture extending through the bar 62, and then the user can move their thumb side-to-side to rotate and change the angle of positioning of the toy 10 within the seat 60 relative to the grip 54.

The trigger 56 can be coupled to and actuatable relative to the grip 54. More specifically, the trigger 56 can be positioned at a front surface or end of the grip 54 and the trigger 56 can extend partially within the grip 54 and partially outside the grip 54. The trigger 56 can be actuatable relative to the grip 54, such that a user can squeeze and compress the trigger 56 to translate the trigger 56 further into the grip 54. A biasing member 64 can be positioned between an interior surface of the grip 54 and the trigger 56, with the biasing member 64 being positioned within an interior of the grip 54. The biasing member 64 can be adapted to force the trigger 56 in a direction away from the grip 54 in the direction towards the front of the toy and actuator assembly 50. The biasing member 64 is configured to continuously bias the trigger 56 outwards. Then when a user squeezes and compresses the trigger 56, the biasing member 64 compresses during translation of the trigger 56 inwards into the grip 54. After a user releases the trigger 56, the biasing member 64 forces the trigger 56 away from the grip 54, as discussed.

The toy and actuator assembly 50 further includes at least one roller 58 coupled to the seat 60 and actuatable by compression of the trigger 56, such that compression of the trigger 56 causes the at least one roller 58 to rotate relative to the seat 60. Further, the at least one roller 58 is in contact with the rolling element 18 upon the toy 10 being connected to the handle actuator 52. The rolling element 18 being adapted to be secured within the seat 60 of the handle actuator 52, and actuation of the trigger 56 causes the at least one roller 58 to rotate or roll the rolling element 18 within the seat 60 to produce movement of the arm 22.

More specifically, as shown best in FIG. 6A, the trigger 56 can include a gear rack 66 disposed on an uppermost surface of the trigger 56. A pinion gear 68 including a gear 70 can be coupled to the grip 54, and the pinion gear 68 can be configured to engage with the gear rack 66 of the trigger 56. Further, the gear 70 of the pinion gear 68 can be sized to engage with a roller gear 72 of the at least one roller 58. As such, upon actuation and compression of the trigger 56, the gear rack 66 of the trigger 56 engages with and causes the pinion gear 68 to rotate. In turn, rotation of the pinion gear 68 causes the gear 70 of the pinion gear 68 to rotate. The gear 70 being engaged with the roller gear 72 of the at least one roller 58 such that the at least one roller 58 rotates relative to the seat 60 and the grip 54. Therefore, compression of the trigger 56 causes the at least one roller 58 to rotate relative to the seat 60, through each of the gear rack 66, pinion gear 68, gear 70, and roller gear 72.

In some examples, as illustrated in FIG. 6A, the at least one roller 58 can include a first roller and a second roller positioned on opposite sides or halves of the seat 60. The first and second rollers of the at least one roller 58 can be connected through a shaft, such that induced rotation of one of the rollers 58 will cause rotation of the other roller 58. Therefore, each of the first roller and second roller of the at least one roller 58 can engage with the rolling element 18, when the toy 10 is connected to the handle actuator 52, to cause rotation or rolling of the rolling element 18. As discussed, the rotation or rolling of the rolling element 18 causes the desired movement of the arms 22.

As shown best in FIGS. 5A-5B, the handle actuator 52 can include a connector 74 disposed adjacent a front end of the grip 54, near the seat 60. The connector 74 being adapted for connecting to a connector 74 of a second or separate toy and actuator assembly 50. In other words, the connector 74 can be utilized to couple and connect handle actuators 52 of two separate toy and actuator assemblies 50A, 50B together, such that the toys 10 connected to each of the handle actuators 52 can fight or battle each other in close proximity. In some examples, the connector 74 can be latches that are designed to be secured together upon a quarter turn (or less) of the connectors 74 of each handle actuator 52 relative to each other. In other examples, the connector 74 can be a plug and socket connector in which the connectors 74 of each handle actuator 52 are pressed together to produce a snap-fit or friction-fit connection. In any example, the connector 74 is configured to couple and secure a first toy and actuator assembly 50A to a second toy and actuator assembly 50B, allowing the users to engage in battle in close proximity between the respective toys 10 connected to the handle actuators 52.

As will be appreciated by those skilled in the art, the present disclosure relates to a toy 10 including actuatable arms 22 that move back and forth upon rotation or rolling of the rolling element 18 to produce arm movements that simulate fighting or punching. The toy 10 can be connected to the handle actuator 52 to create the toy and actuator assembly 50, which can be used to simulate close proximity fighting or battle. A user can actuate the trigger 56 of the handle actuator 52 to cause the rolling element 18 to rotate or roll, which produces the desired movements of the arms 22. The toy 10 of the present disclosure can be designed to resemble a warrior or other character that is intended to fight or battle with other warriors or characters. As such, a user can choose a toy 10 resembling a warrior or character of their liking, and then battle with other warriors or characters with the goal of defeating their opponent in one way or another.

FIG. 8A includes side views of a second embodiment of a toy 110 of the present disclosure in exploded and assembled orientations, with the cover shown transparent in the assembled orientation. FIG. 8B includes side cross-sectional views of the toy 110 in the exploded and assembled orientations. FIG. 8C includes front cross-sectional views of the toy 110 in the exploded and assembled orientations. FIGS. 8A-8C will be discussed together.

It is to be understood that the toy 110 of FIGS. 8A-8C is substantially similar to the toy 10 of FIGS. 1-4, and that the toy 110 is an alternative or additional embodiment to the toy 10, previously discussed. Further, it is to be understood that the discussion regarding the toy 10 of FIGS. 1-4 equally applies to the toy 110 of FIGS. 8A-8C unless noted otherwise, and that the same or similar components of the toy 110 of FIGS. 8A-8C are labelled with reference numerals increased by a value of 100. Therefore, in an effort to avoid redundancy, only the differences between the toy 10 of FIGS. 1-4 and the toy 110 of FIGS. 8A-8C will be discussed hereinafter.

The main differences between the toy 110 and the toy 10 is the way in which the cover 114 is coupled to the assembly and the indictor used to indicate when the triggering target 142 has been struck by an opponent. As illustrated, the toy 110 further includes a support band 128 that extends about the rolling elements 118A, 118B at a medial location and provides supports on opposing sides for the shafts 130 of the arm cams 120. The support band 128 also includes a front connector portion 128A and a rear connector portion 128B, which are disposed at the front and rear, respectively, of the counter-balanced frame 112 with respect to the rolling direction of the toy 110. The front and rear connector portions 128A, 128B are disposed radially outward of the rolling element 118, with respect to a central axis of the rolling element 118. The support band 128 is configured to aid in aligning the cover 114 relative to the counter-balanced frame 112 when the cover 114 is engaged to the frame 112. The front and rear connector portions 128A, 128B are also configured for engaging the toy 110 with handle actuator 152, as discussed in further detail below.

In this embodiment of the toy 110, the cover 114 is separable from and connectable to the counter-balanced frame 112. To connect the cover 114 to the counter-balanced frame 112, a user inserts the cover 114 in a direction from a top down towards and onto the counter-balanced frame 112 where it is aligned in position and stabilized by the support band 128. Further, a socket 132 on the inside of the cover is adapted to slide over a post 133 that extends upwardly from the counter-balanced frame 112 with a sliding fit The counter-balanced frame 112 can include the detent 140 disposed at the distal second end of the post 133, which is utilized to connect and secure the cover 114 to the counter-balanced frame 112. The cover 114 can include the triggering target 142, the resilient element 144, and a coupling 146 disposed within and connected to the cover 114. The resilient element 144 is disposed between the triggering target 142 and an internal surface of the cover 114, and the resilient element 144 is configured to bias the triggering target 142 away from a center of the cover 114. The coupling 146 is disposed adjacent the triggering target 142 and the resilient element 144, and the coupling 146 extends from the triggering target 142 to and past a center of the cover 114. The coupling 146 is configured to engage with the detent 140, preferably via a slot in the coupling 146, to connect and secure the cover 114 to the counter-balanced frame 112 by pressing the cover 114 downwardly into position against the force of the spring 138 with the socket 132 aligned with the post 133, such that upon a ramp surface 135 at the top of the post 133 contacting the slot in the coupling 146, the coupling 146 slides against the force of the resilient element 144 until the detent 140 passes through the slot, whereupon the resilient element 144 causes the coupling 146 to slide back such that the detent 140 engages over the slot.

With the cover 114 connected to the counter-balanced frame 112, the spring 138 of the counter-balanced frame 112 is compressed. The detent 140 holds the cover 114 securely in place until an external force causes separation of the cover 114 and the counter-balanced frame 112. Upon compression of the triggering target 142 and the resilient element 144, the coupling 146 translates in a direction away from the front portion of the cover 114 towards a rear portion of the cover 114, which releases the coupling 146 from connection with the detent 140. Upon release of the coupling 146 from the detent 140, the spring 138 induces a force that causes the cover 114 to move upwards away from the counter-balanced frame 112 and away from the supporting or rolling surface upon with the rolling element 118 rotates or rolls, causing the cover 114 to move upwardly and preferably pop-off of the frame 112.

As such, the toy 10 of FIGS. 1-4 includes a button 36 that actuates upwards to indicate that the triggering target 42 has been struck, while the toy 110 of FIGS. 8A-8C does not include the button but rather the entire cover 114 actuates upwards and potentially off of the counter-balanced frame 112 to indicate that the triggering target 142 has been struck. Therefore, the indictor used to indicate when the triggering target 142 has been struck by an opponent is slightly different than the embodiment of FIGS. 1-4. To reconnect the cover 114 back onto the counter-balanced frame 112, a user presses the cover 114 down onto the counter-balanced frame 112. The coupling 146 engages with the detent 140 to secure and couple to cover 114 to the counter-balanced frame 112.

FIGS. 8D-8F include several views of the second embodiment of a toy 110 illustrated in FIGS. 8A-8C, with the inclusion of a braking mechanism. As such, it is to be understood that the disclosure regarding FIGS. 8A-8C equally applies to FIGS. 8D-8F, and in an effort to avoid redundancy only the details regarding the braking mechanism will be discussed with reference to FIGS. 8D-8F.

The braking mechanism includes a brake pad 139 that can be positioned between the ramp surface 135 and the spring 138, and the brake pad 139 can be positioned adjacent and contacting an axial distal end of the spring 138 positioned furthest from the axle 116. The brake pad 139 may be fixedly coupled to the spring 138, such that the brake pad 139 translates along with the spring 138 when the cover 114 has been released and extended. As illustrated, when the cover 114 is in the locked or downward position, the braking pad 139 is positioned within the rolling element 118 such that the brake pad 139 is not in contact with any surface of the rolling element 118. After the cover 114 has been released, the spring 138 forces the brake pad 139 upwards into the released and extended position. Referring to the lower figures in FIGS. 8E-8F, once the brake pad 139 has been forced and translates upwards away from the axle 116, the brake pad 139 comes into contact with an inner surface of the rolling element 118. Specifically, the braking mechanism forces the brake pad 139 into contact with an inner surface of each of the first ball segment 118A and the second ball segment 118B of the rolling element 118. The contact and engagement between the brake pad 139 and the rolling element 118 creates friction which is intended to stop or reduce the rolling velocity of the rolling element 118.

As such, the braking mechanism including the brake pad 139 is configured to slow down or stop the rolling function of the rolling element 118 once the cover 114 has been released into the extended or popped off position. Stopping or reducing the rolling speed of the toy 110 allows the user to easily grab the toy 110 and reattach the cover 114 by pushing the cover 114 downward towards the axle 116 until the detent 140 engages with the coupling 146 of the cover 114. After that, the cover 114 will remain in the retracted and connected orientation until the cover 114 is again released by compression of the triggering target 142.

FIG. 8G is a top view of the brake pad 139. FIG. 8H is a side view of the brake pad 139. FIGS. 8G-8H will be discussed together. The brake pad 139 illustrated in FIGS. 8G-8H is the brake pad 139 utilized in the second embodiment of the toy 110 illustrated in FIGS. 8D-8F. In some examples, as illustrated, the brake pad 139 can have the shape of a circular disc. Specifically, the braking pad 139 can have a circular cross-sectional shape viewing in the axial direction (FIG. 8G), and the brake pad 139 can have a relatively thin thickness compared to the diameter of the brake pad 139. In addition, the brake pad 139 can include a brake aperture 139A extending fully through the brake pad 139. The brake aperture 139A can be utilized to couple the brake pad 139 to the post 133 (FIG. 8C). As such, the brake aperture 139A can be inserted onto the post 133 to couple the brake pad 139 to the post 133. The brake aperture 139A includes a mating shape with the post 133, facilitating the insertion of the brake pad 139 onto the post 133. In the illustrated example, the brake aperture 139A includes the shape of a cross. In other examples, the brake aperture 139A can include any other mating shape with the post 133.

FIG. 9A is a side cross-sectional view of a second embodiment of a toy and actuator assembly 150 with the toy 110 connected to a second embodiment of a handle actuator 152. FIG. 9B is a front cross-sectional view of the toy and actuator assembly 150. FIGS. 10A-10C are partial side views illustrating the process of connecting two of the toy and actuator assemblies 150. FIG. 11 is a side cross-sectional view illustrating two of the toy and actuator assemblies 150 connected together. FIGS. 9A-11 will be discussed together.

It is to be understood that the toy and actuator assembly 150 of FIGS. 9A-11 is substantially similar to the toy and actuator assembly 50 of FIGS. 5A-7B, and that the toy and actuator assembly 150 is an alternative or additional embodiment to the toy and actuator assembly 50, previously discussed. Further, it is to be understood that the discussion regarding the toy and actuator assembly 50 of FIGS. 5A-7B equally applies to the toy and actuator assembly 150 of FIGS. 9A-11 unless noted otherwise, and that the same or similar components of the toy and actuator assembly 150 of FIGS. 9A-11 are labelled with reference numerals increased by a value of 100. Therefore, in an effort to avoid redundancy, only the differences between the toy and actuator assembly 50 of FIGS. 5A-7B and the toy and actuator assembly 150 of FIGS. 9A-11 will be discussed hereinafter.

The toy 110 discussed with reference to FIGS. 8A-8C can be utilized along with a handle actuator 152 to form the toy and actuator assembly 150. The counter-balanced frame 112 of the toy 110 can be adapted to be secured to a seat 160 of the handle actuator 152, for example via front and rear clips 161A, 161B that are adapted to engage the front and rear connector portions 128A, 128B, respectively of the support band 128. Here, at least the rear clip 161B is resilient, and a release tab 163 may be used to unclip it from the rear connector portion 128B to release the toy 110. Actuation of the handle actuator 152 can cause the rolling element 118 to rotate or roll within the seat 160 to produce movement of the arms 122, as previously discussed. More specifically, the handle actuator 152 can include a trigger 156, illustrated here as a grip-pull trigger, that can be actuated to cause at least one roller 158 of the handle actuator 152 to rotate. The at least one roller 158 can be in contact with the rolling element 118 to cause the rolling element 118 to rotate or roll within the seat 160 to produce the movement of the arm(s) 122.

The main differences between the toy and actuator assembly 150 and the toy and actuator assembly 50 are the trigger 156, the seat 160, and the connector 174. The trigger 156 of the toy and actuator assembly 150 can be a full grip-pull trigger instead of a single finger trigger, as discussed with reference to the toy and actuator assembly 50. More specifically, to actuate the trigger 156, a user can squeeze with each of their four fingers and their thumb can be wrapped around the grip 154 to hold the handle actuator 152. As such, a user can utilize their whole hand (including all the fingers and thumb) to squeeze and compress the trigger 156 to produce the movement of the arm(s) 122 when the toy 110 is connected to the handle actuator 152. In addition, the toy and actuator assembly 150 can include a bevel gear in the gear train within the handle actuator 152, such that actuation of the trigger 156 causes the gear train, including the bevel gear to activate and rotate the at least one roller 158 to produce the movement of the arm(s) 122. Lastly, during squeezing and compression of the trigger 156, at least a portion of the entire trigger 156 translate into the grip 154 of the handle actuator 152.

The seat 160 of the toy and actuator assembly 150 can preferably include one or more clips 161A, 161B configured to contact and lock the toy 110 within the seat 160. The clip(s) 161A, 161B can extend upwards from the seat 160 in a direction towards the toy 110 and away from the handle actuator 152. Further, the clip(s) 161A, 161B preferably include a front and rear clips 161A, 161B that are each configured to engage with the front and rear portions of the toy 110, respectively, to secure to toy 110 within the seat 160 and to the handle actuator 152 while allowing the rolling element 118 to roll or rotate relative to the cover 114. In some examples, the clip(s) 161A, 161B can be formed integral with the seat 160. In other examples, the clip(s) 161A, 161B can be coupled to the seat 160 using known means. Further, in some examples, the clip(s) 161A, 161B can be disposed approximately centrally with respect to a width of the handle actuator 152 (as shown in FIG. 9B), such that the clip(s) 161A, 161B connect to the support band 128 at a generally central position with respect to a width of the cover 114. To release the toy 110 from the clip(s) 161A, 161B, a user can press a rearward extending tab of the at least one clip 161B downwards to release the clip and separate the toy 110 from the handle actuator 152.

Referring to FIGS. 10A-10C and 11, a second example of a connector 174 that can be utilized to connect first and second toy and actuator assemblies 150A, 150B together is shown. In this example, the connector 174 can include a first connector 174A on a first toy and actuator assembly 150A, and a second connector 174B on a second toy and actuator assembly 150B. The first and second connectors 174A, 174B are mating connectors that are configured to mate and be secured together. In the illustrated example, the first connector 174A can be a rod with an aperture or opening below the rod. Further, the second connector 174B can be a hook that is configured to insert into the aperture or opening below the rod and then loop upwards toward in order to hook and catch the rod from the underside, as illustrated in FIGS. 10A-10B. The first and second connectors 174A, 174B are located at the top of the respective handle actuators 152. Here, it is possible for each of the handle actuators 152A, 152B to include one of each of the first and second connectors 174A, 174B that are arranged adjacent to each other such that as the first and second toy and actuator assemblies 150A, 150B are being engaged together, the second connector 174B of each of the toy and actuator assemblies engages in the oppositely located first connector 174A of the other toy and actuator assembly. This allows the handle actuators 152 to be universal.

In addition, the first and second toy and actuator assemblies 150A, 150B can also include latches 175A, 175B, respectively, preferably located at an opposite end of the handle actuators 152 from the first and second connectors 174A, 174B. The first and second latches 175A, 175B can each be biased by respective springs 176 downward towards a base or bottom of the handle actuator 152 and the overall toy and actuator assemblies 150A, 150B. The latches 175A, 175B can be inserted into respective mating apertures 178A, 178B on the other one of the toy and actuator assemblies 150A, 150B, as the handle actuators 152 are pivoted together about the engaged first and second connectors 174A, 174B, and the respective springs 176 can keep the latches 175A, 175B secured in a locked positioned until an external force causes the latches 175A, 175B to be released. As such, the first and second latches 175A, 175B are configured to secure the first and second toy and actuator assemblies 150A, 150B together during battle between opponents. To release the latches 175A, 175B, a user can press upwards on a bottom portion of the respective latches 175A, 175B to compress the springs 176 and release the latches 175A, 175B from the apertures they are secured within.

Those skilled in the art will recognize that various different types of connector(s) 74, 174 can be utilized within the scope of the present disclosure.

Having thus described the present embodiments in detail, it is to be appreciated and will be apparent to those skilled in the art that many physical changes, only a few of which are exemplified in the detailed description of the disclosure, could be made without altering the inventive concepts and principles embodied therein.

It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the disclosure being indicated by the appended claims rather than by the foregoing description, and all alternate embodiments and changes to this embodiment which come within the meaning and range of equivalency of said claims are therefore to be embraced therein.

What is claimed is:

1. A toy comprising:

a counter-balanced frame including a counter balance coupled to a first end of the counter-balanced frame and a cover coupled to the counter-balanced frame;

an axle coupled to and extending through the counter-balanced frame, the axle being configured to rotate relative to the counter-balanced frame;

a rolling element configured to rotate relative to the counter-balanced frame about an axis, the rolling element including a first ball segment and a second ball segment, and at least one of the first ball segment and the second ball segment includes a pin directly coupled to or formed integral with a respective ball segment of the rolling element, the pin extending from an outer surface of the rolling element generally parallel to and offset from the axle;

an arm cam mounted for pivoting movement relative to the counter-balanced frame and adapted to contact the pin of the rolling element; and an arm connected to the arm cam, and the arm being located outside of the cover;

wherein upon rolling of the rolling element the pin causes the arm cam to actuate relative to the cover to produce movement of the arm.

2. The toy of claim 1, wherein the pin extends from the outer surface of the rolling element in a direction away from the counter-balanced frame and parallel to an axis of the axle.

3. The toy of claim 1, wherein the cover remains in a generally upright position relative to the rolling element during rolling of the rolling element.

4. The toy of claim 1, wherein the first ball segment is being coupled to a first axial end of the axle and the second ball segment being coupled to a second axial end of the axle.

5. The toy of claim 4, wherein the counter-balanced frame is centrally located between the first ball segment and the second ball segment, with the axle extending therethrough.

6. The toy of claim 1, wherein the counter-balanced frame remains free from contact with a rolling surface during rolling of the rolling element on the rolling surface.

7. The toy of claim 1, wherein the movement of the arm is a back and forth swinging arm movement.

8. The toy of claim 1, wherein the arm cam includes a shaft extending from the arm cam and through at least one of the cover or a support connected to the counter-balanced frame in a direction generally parallel to an axis of the axle, the arm being coupled to the shaft of the arm cam.

9. The toy of claim 1, further comprising a button disposed at the second end of the counter-balanced frame and having a portion that extends inside cover, the button being actuatable between an extended orientation and a retracted orientation relative to the cover.

10. The toy of claim 9, further comprising a triggering target on the cover, the triggering target being biased outwardly from the cover, wherein upon compression of the triggering target, a detent releases the button and the button is moved into the extended orientation.

11. The toy of claim 10, wherein the button is spring biased via a spring that is oriented generally axially perpendicular to an axis of the axle.

12. The toy of claim 10, wherein a resilient element biases the triggering target outwardly and biases the detent towards the triggering target, such that upon compression of the triggering target the resilient element is compressed.

13. The toy of claim 1, wherein the cover is releasably coupled to the counter-balanced frame, and a triggering target on the cover, the triggering target being biased outwardly from the cover, wherein upon compression of the triggering target, a detent releases the cover and the cover is at least one of moved relative to or disengaged from the counter-balanced frame.

14. The toy of claim 13, wherein the cover is spring biased via a spring that is oriented generally axially perpendicular to an axis of the axle.

15. A toy and actuator assembly comprising:

a toy comprising:

a counter-balanced frame including an axle;

a rolling element configured to rotate relative to the counter-balanced frame about an axis; and an arm cam adapted to contact a pin of the rolling element, and an arm located outside of a cover, the arm being connected to the arm cam, wherein upon rolling of the rolling element the pin causes the arm cam to actuate to produce movement of the arm; and a handle actuator connectable to and separable from the toy, the handle actuator comprising:

a grip with a seat disposed at an end of the grip;

a trigger coupled to and actuatable relative to the grip; and at least one roller coupled to the seat and actuatable by compression of the trigger, such that compression of the trigger causes the at least one roller to rotate relative to the seat, wherein the at least one roller is in contact with the rolling element upon the toy being connected to the handle actuator.

16. The toy and actuator assembly of claim 15, wherein the rolling element is adapted to be secured within the seat of the handle actuator, and actuation of the trigger causes the at least one roller to roll the rolling element within the seat to produce movement of the arm.

17. The toy and actuator assembly of claim 15, wherein a biasing member is disposed between the grip and the trigger, and the biasing member is adapted to force the trigger in a direction away from the grip.

18. The toy and actuator assembly of claim 15, further comprising a bar coupled to the seat and extending from the seat in a direction opposite the trigger, the bar being adapted to induce rotation of the seat relative to the grip.

19. The toy and actuator assembly of claim 15, further comprising a connector disposed adjacent a front end of the grip, the connector being adapted for connecting to a connector of a second or separate action toy.

20. The toy and actuator assembly of claim 19, wherein the connector is a plug and socket connector.

21. The toy and actuator assembly of claim 19, wherein the connector comprises a first connector being a rod and a second connector being a hook.

22. The toy and actuator assembly of claim 15, further comprising a clip extending from the seat, the clip being adapted to connect the toy to the handle actuator.

23. The toy and actuator assembly of claim 22, wherein the clip is adapted to engage with at least one of the counter-balanced frame or a support connected to the counter-balanced frame of the toy to connect the toy to the handle actuator.

24. A toy comprising;

a counter-balanced frame including a counter balance coupled to a first end of the counter-balanced frame and a cover coupled to the counter-balanced frame;

an axle coupled to and extending through the counter-balanced frame, the axle being configured to rotate relative to the counter-balanced frame;

a rolling element configured to rotate relative to the counter-balanced frame about an axis, the rolling element including a pin extending from an outer surface of the rolling element generally parallel to and offset from the axle;

an arm cam mounted for pivoting movement relative to the counter-balanced frame and adapted to contact the pin of the rolling element;

an arm connected to the arm cam, and the arm being located outside of the cover, wherein upon rolling of the rolling element the pin causes the arm cam to actuate relative to the cover to produce movement of the arm;

a button disposed at a second end of the counter-balanced frame and having a portion that extends inside the cover, the button being actuatable between an extended orientation and a retracted orientation relative to the cover, wherein the button is spring biased via a spring that is oriented generally axially perpendicular to an axis of the axle;

a triggering target on the cover, the triggering target being biased outwardly from the cover, wherein upon compression of the triggering target, a detent releases the button and the button is moved into the extended orientation; and a braking mechanism having a brake pad that contacts an axial end of the spring positioned furthest from the axle, the brake pad is configured to contact an inner surface of the rolling element to stop or slow rotation of the rolling element upon the triggering target being compressed.

* * * * *